Nov. 15, 1966 — O. E. MILLER — 3,285,418
TANK COVER
Filed Feb. 19, 1963 — 2 Sheets-Sheet 1
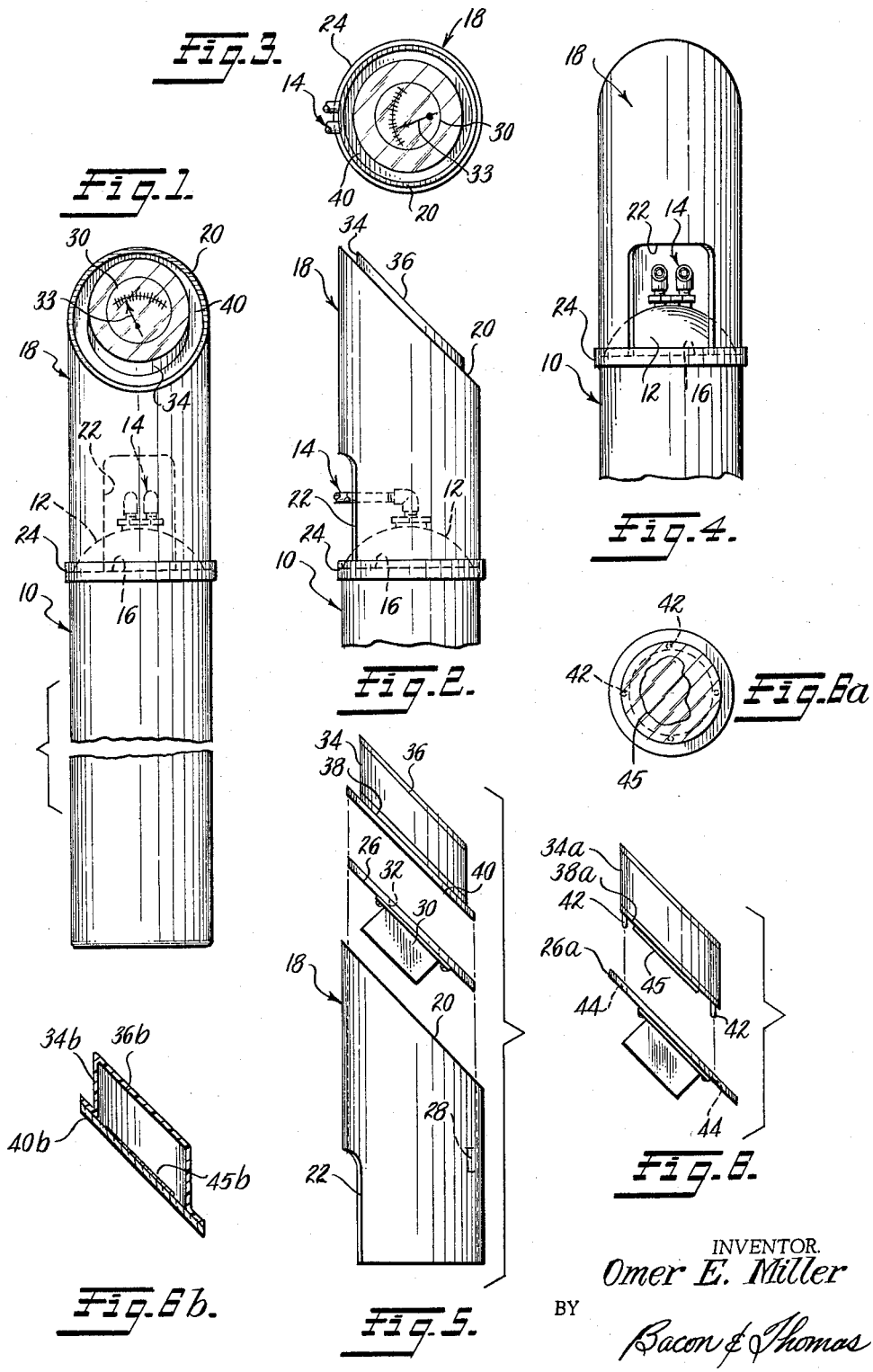
INVENTOR.
Omer E. Miller
BY
Bacon & Thomas
ATTORNEYS

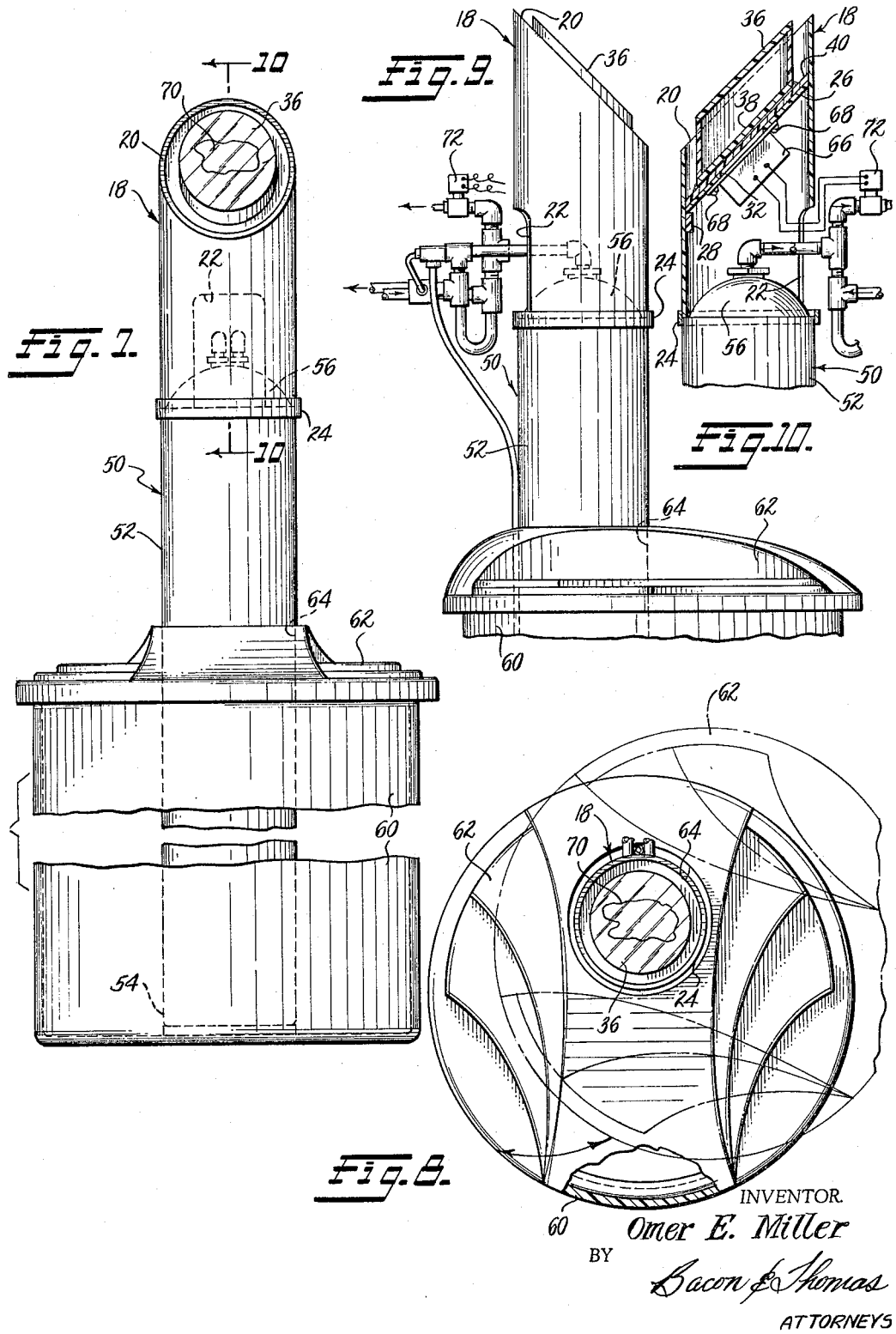

United States Patent Office 3,285,418
Patented Nov. 15, 1966

3,285,418
TANK COVER
Omer E. Miller, 2316 Linden Ave., South Plainfield, N.J.
Filed Feb. 19, 1963, Ser. No. 259,601
19 Claims. (Cl. 210—140)

The present invention, in its principal embodiment, relates to a novel tank cover which fits over the top of a tank and serves as a mounting for advertising display means and/or for tank control means while at the same time improving the overall appearance of the equipment. The invention also relates to certain novel tank cover combinations, and in particular to those of domestic water-softening systems which employ ion exchange and regenerating tanks.

The tank cover of the invention, in its broad aspect, is adapted for use on tanks which serve many different functions. Thus, it may be used on hot water heaters, pressure tanks for private well systems, air compressor tanks, water conditioning tanks, etc. These tanks usually have associated controls such as thermostats, pressure gauges and switches, timers and the like. Such controls are often located at relatively inaccessible positions and frequently stick out from the side or end of the tank so as to provide a generally unsightly appearance.

In the manufacture of cylindrical tanks, particularly those of plastic, the end sections are generally secured to the inside walls of the cylindrical sections. The outside of the top ends are generally convex and this dome-shaped convex portion protrudes beyond the cylindrical section and may have pipe connections associated therewith. The present invention provides an attractive cover, which not only hides the piping at the top of the tank, but holds operational controls as well, and which can be readily positioned on the top of a tank of the type described by snapping it over the dome-shaped end piece.

It is accordingly, an object of the invention to provide a tank cover which is easy to install and which improves the eye appeal and general appearance of the tank on which it is used.

A further object of the invention is to provide a novel tank cover which not only improves the appearance of the tank, but serves as a mounting for control mechanism for controlling the operation of the system in which the tank is incorporated.

Another object of the invention is to provide a tank cover which can be snapped in place over the dome-shaped top of a cylindrical tank.

Another object of the invention is to provide a tank cover having structure providing a shadow box effect for an advertising display, control dial, or the like.

Another object of the invention is to provide tank cover structure mounting tank controls in a convenient, substantially eye level position.

A further object of the invention is to provide a tank cover assembly for mounting associated elements of the tank, e.g., electrical controls, advertising displays and the like out of the immediate environmental atmosphere of the tank. For instance, tanks carrying water will often sweat, particularly during the summertime, whereas the novel tank cover of the present invention will not.

A still further object of the invention is to provide tank and tank cover combinations that are compact, space conserving, present a pleasing appearance to the eye, and render tank contents and controls readily accessible.

Additional objects and advantages will be apparent in the following detailed description and from the accompanying drawings in which:

FIG. 1 is a front elevation of a tank and tank cover constructed in accordance with the principles of the present invention;

FIG. 2 is a partial side elevation of the tank and cover structure shown in FIG. 1;

FIG. 3 is a top view of the structure shown in FIG. 2;

FIG. 4 is a partial rear view of the tank and cover structure shown in FIG. 1;

FIG. 5 is an exploded side view of one embodiment of tank cover elements for the tank cover shown in FIG. 1;

FIG. 6 is an exploded side view of another embodiment of tank cover elements that may be used in the tank cover shown in FIG. 1;

FIG. 6a is a top view of the embodiment shown in FIG. 6;

FIG. 6b is a vertical sectional view of another modification of a tank cover element which may be used in the tank cover shown in FIG. 1;

FIG. 7 is a front elevation of a water conditioning system in which the tank and tank cover of the present invention is incorporated;

FIG. 8 is a top plan view of the water conditioning system of FIG. 7;

FIG. 9 is a partial side elevation view of the tank and tank cover structure of the system shown in FIG. 7; and FIG. 10 is an enlarged sectional view taken along the line 10—10 of FIG. 7 and illustrating the details of the tank cover and tank controls.

Referring now to the drawings and particularly to FIGS. 1–5, there is shown a standard cylindrical tank 10 made of plastic, galvanized steel or the like, depending upon its use, having a dome-shaped top 12 to which piping 14 is connected. Tanks of the type illustrated have a shoulder 16 (FIG. 2) formed by reason of the dome-shaped top being welded, cemented, or otherwise sealed within a cylindrical upright member. The cover member of the present invention comprises a hollow tubular housing 18, which is of substantially the same diameter as the side wall of the tank 10 that the cover is adapted to be fitted upon. The bottom end of tubular housing 18 is cut off on a horizontal plane, i.e., perpendicular to the longitudinal axis, so that it fits flush with the shoulder 16 of the tank. The top end 20 of the tubular housing 18 is cut off along a plane forming an angle to the horizontal. The angle formed by a plane containing the upper end 20 of the tubular housing 18 and an imaginary horizontal plane may vary over a wide range but is generally between about 25° to 65°. In the embodiment shown, the upper end 20 is cut off along an angular plane forming an angle of 45° with the horizontal.

The rear wall of the tubular housing 18 at the bottom end is provided with an elongated opening or slot 22, which serves the dual purpose of accommodating piping from the top of the tank, as well as permitting the bottom portion of the tubular housing 18 to be resiliently enlarged to permit the housing to be snapped in place on the dome-shaped top 12 of the tank. In other words, this portion of the tubular housing 18 is adapted to be force fit upon the dome-shaped top of the tank so as to be firmly retained thereon in normal usage but readily removable when access to the tank top is desired. The tubular member 18 may be made of any suitable material such as metal or plastic and may be of the same material as the tank on which it is to be used or of different material. Thus, a matching plastic member may be used with a steel tank. Sometimes it is desirable from a dielectric standpoint that the materials be different.

The juncture between the tank 10 and the tubular cover member 18 may be covered by a band 24, if desired. The band 24 may be of contrasting color for provision of more attractive appearance and may also be utilized to help anchor the member 18 in place. It will be understood, however, that such band is optional, particularly where the device is constructed to provide for a force fit on the top of the tank. In tanks of different top structure wherein a force fit cannot be obtained, such a band or other anchoring means will be essential, as will be apparent to those skilled in the art.

The tank cover further comprises a plate 26 having a configuration corresponding substantially to the configuration of the inside periphery of the angled top end of the housing 18. As shown in FIGS. 1—5 this plate 26 is of oval shape and fits snugly within the top of the tubular housing 18. A stop member 28 (FIG. 5) is provided on the inside forward wall of the tubular housing 18 and supports the lower edge of the plate 26. The plate 26, therefore, rests within the tubular housing 18 spaced from the top 20 in a position as shown in FIG. 1. As shown in FIG. 5, the plate 26 serves to mount a tank control or indicator device 30 such as a timing unit, thermostat, temperature indicator, pressure gauge or the like. This is bolted or otherwise secured to the bottom face of the plate 26 as shown. Plate 26 is provided with a center opening or aperture 32 to permit the face of the control device to be seen by one looking into the top of the tubular housing 18. Where control levers are associated with the control device, this aperture also permits ready access for their manual adjustment. In FIGS. 1 and 3 the face of the indicator or control device 30 is shown as having a needle and scale 33.

Mounted upon the plate 26 is a tubular member 34 of reduced diameter with respect to housing 18, the top and bottom edges of which are inclined along planes at substantially the same angle to the horizontal as the top edge 20 of the housing 18. Tubular member 34 is of such length as to extend slightly above the top of the housing 18, as shown in FIG. 2, when it is in place in the assembly. The member 34 is preferably of transparent plastic such as Lucite or the like but may be of glass, and is provided with top and bottom walls or lenses 36 and 38 (FIG. 5) which may also be of transparent plastic or glass. These walls may be cemented in place with any suitable transparent plastic cement. Alternatively, the member 34 and one of its top or bottom walls, e.g., top wall 36 may be vacuum formed or transparent plastic. The member 34 is mounted within the top of the tubular housing 18 on plate 26 by any of several means. Thus, it may be cemented or otherwise secured to a separate plate 40, as shown in FIG. 5, which is of the same configuration as plate 26. In this instance, the assembly comprising the member 34 and its supporting plate 40 slides within the top of the housing 18 and rests upon plate 26. A loose fit is permissible since the interior walls of housing 18 will form shadows which will cover the parting line between plate 40 and the inside of the tubular housing. The loose fit facilitates removal of the assembly for access to the control below. The plate 40 may be transparent to permit the top face of the control element 30 to be visually observed, or it may be opaque if desired, so as to form a background for an advertising display or other indicia carried by the bottom lens 38 of the member 34. For example, the bottom wall 38 may have a trademark or other advertising matter silk screened upon it so as to appear to the eye in the manner shown in the modification in FIGS. 6 and 6a. The transparent tubular member 34 and associated elements from a "showcase" for the advertising display or for the face of the control device, depending upon which is desired, the top and bottom walls 36 and 38 serving as top and bottom lenses for such a showcase. The interior walls of the housing 18 around the recessed showcase form a "shadow box" effect for the showcase. It will be understood, of course, that in the instance in which it is desired to show the face of the control device, the member 34 forms a showcase for such control device.

FIG. 6 shows an alternative manner in which showcase or tubular member 34a and associated lenses may be mounted upon plate 26a. In this instance, downwardly projecting dowels 42 are cemented to the bottom lens 38a, and the plate 26a is provided with apertures 44 adapted to receive such dowels in mating relation. It will be understood that in the device as shown in either FIGS. 5 and 6, the showcase assembly may be readily removed by merely lifting it upwardly from the end of the housing 18, the assembly becoming readily detached from plate 26.

In FIGS. 6 and 6a, an advertising display 45 is shown in position on the bottom lens 38. This may be silk screened upon the bottom lens, painted thereon or may be in the form of a decal secured to the bottom lens by means of transparent adhesive. The thickness of such display is exaggerated in the drawings. When the structure of FIG. 5 is employed, such a display may be readily sandwiched between bottom lens 38 and supporting plate 40.

Alternatively, as shown in FIG. 6b, a display 45b may be positioned on the top surface of a supporting plate 40b. Bottom lens 38 may be omitted if desired. The top wall 36b, tubular element 34b and a flange 35 having the approximate configuration of plate 40 (40b) are vacuum formed of suitable transparent plastic. Flange 35 is cemented or otherwise secured to the underlying plate 40b. This assembly may be used within the housing 18 with or without the underlying plate 26 and control box 30. Where the plate 40b is transparent it may, of course, be used as a lower lens with the display on the bottom surface rather than the top surface.

FIGS. 7–10 show a specific embodiment of the tank cover and control mounting device in combination with a water conditioning system. Referring now particularly to these figures of the drawings, there is shown a cylindrical tank 50 containing ion exchange resin for water softening or conditioning. The side walls of the tank 50 are formed by a cylindrical section 52 preferably made of plastic which may be reinforced with fiberglass. The end sections 54 and 56 are preferably formed of the same material as the cylindrical wall section 52, and are cemented to the interior walls of the cylindrical section 52. The outside of the top end section 56 is convex in shape and protrudes beyond the edge of the cylindrical section 52 thereby forming a dome on top of the tank ringed by the upper edge of the cylindrical section. Such tanks are readily available on the market and are commonly used in water softening apparatus.

In accordance with a feature of the present invention, the ion exchange resin tank 50 is mounted within a container or tank 60, of larger diameter than tank 50, which is designed to hold salt or salt brine for regenerating the resin bed at the end of a water softening cycle. The connections between the two tanks and the valve arrangements for the service and regenerating cycles may be of conventional design but preferably are of the type disclosed in applicant's patents, Nos. 2,751,347 and 2,935,196.

As shown, the salt regenerating container 60 is provided with a lid 62 and the ion exchange tank 52 is received in an aperture 64 in lid 62. Aperture 64 is offset from the center of the lid 62 as shown. The positioning of one tank within the other conserves space and provides a better overall appearance. By reason of the offset location of the tank 52 within the container 60 the tank 52 may be used as a pivot for the lid 62. Thus, as shown in FIG. 8 ready access to the salt regenerating container may be had by merely raising the lid 62 and swinging it to one side using tank 52 as the pivotal axis.

The container 60, as well as its lid 62, may be of transparent plastic to enable visual inspection of the salt level condition in container 60. It may also be translucent to add decorative appeal as well as still allowing visual inspection therethrough into the underlying container.

As shown in FIG. 10, the plate 26 serves to mount a timer 66 which is attached to its underside by means of bolts 68. The showcase and supporting structure is of the type shown in FIG. 5. The bottom lens 38 of the showcase contains the trademark 70 of the manufacturer silk screened upon the transparent plastic surface. This display 70 is also shown in FIG. 7. The timer 66 is electrically connected to a source of electrical energy (not shown) and to a solenoid-operated valve 72 in the piping arrangement for the water softening system. The arrangement shown is a portion of the system disclosed in the previously mentioned patents, Nos. 2,751,347 and 2,935,196. The solenoid valve 72 is in a drain line and its operation by timer 66 governs the periodic regeneration of the resin bed by salt from the brine tank 60. The dials (not shown) of the timing device 66 may be set as desired by simply removing the showcase assembly and its associated mounting plate 40, the aperture 32 through mounting plate 26 providing access to such dials.

It will be understood that the tank cover and tank combinations of the present invention may be used in any of a number of tank systems to provide attractive appearance and convenient mounting of a control means. In vertical tanks, as usually used in domestic situations, the tank cover places the control device or advertising display at substantially eye level.

While the cover assembly has been illustrated with cylindrical tanks, it will be understood that the same principles can be used for tanks or containers of oval, rectangular or other cross-sectional configuration.

I claim:

1. A cover adapted to fit over the top of a tank, comprising: a hollow housing having a bottom end corresponding in configuration substantially to the configuration of the periphery of said tank top and a top end cut off at an angle to the horizontal; a plate having a shape substantially as defined by the opening in the angled end of said housing, said plate being of such dimensions as to slidably fit into the angled end of said housing; and means for retaining said plate at a spaced distance from said angled end within said housing, said plate providing means for mounting tank control devices and display devices.

2. A cover adapted to fit over the top of a vertically disposed cylindrical tank, comprising: a tubular housing, of substantially the same diameter as said tank, having one end cut off along a horizontal plane and the other end cut off at an angle to said horizontal plane; an oval plate having a shape substantially as defined by the opening in the angled end of said tubular housing, said oval plate being of such dimensions as to slidably fit into said angled end of said tubular housing, and means for retaining said oval plate within said tubular housing at a spaced distance from said angled end.

3. A tank cover as defined in claim 2, wherein said retaining means comprises a stop member secured to the inside wall of said tubular housing to limit the distance which said oval plate slides into said tubular housing.

4. A tank cover as defined in claim 2, including a decorative member mounted upon said oval plate.

5. A tank cover as defined in claim 2 wherein said housing has a slot cut in its side wall extending upwardly from said horizontally cut end, said slot accommodating piping from the top of said tank and permitting a resilient enlargement of said slotted end for a force fit upon a tank top.

6. The tank cover as defined in claim 2 wherein said oval plate is provided with a central aperture, tank control means are mounted on said plate below said aperture, and said aperture is covered by a detachable lens permitting visual observation of said tank control means.

7. A cover adapted to fit over the top of a vertically disposed cylindrical tank, comprising: a tubular housing of substantially the same diameter as said tank having its bottom end cut off along a horizontal plane and its top end cut off at an angle to said horizontal plane; means for securing the said bottom end of the housing to a tank top; an oval plate having a shape substantially as defined by the opening in the angled top end of said tubular housing, said oval plate being disposed within the top end of said housing; stop means retaining said oval plate at a spaced distance from the top end of said tubular housing; a showcase assembly mounted upon said oval plate and extending upwardly within the walls of said housing, said showcase assembly comprising a tubular member of smaller diameter than the internal diameter of said housing and having ends cut off at substantially the same angle as the top end of said housing, and transparent top and bottom walls closing the ends of said tubular member and forming lenses for visual observation of an object underlying said showcase.

8. The tank cover as defined in claim 7 wherein the object underlying the showcase is an advertising display disposed on the bottom wall of said showcase assembly.

9. The tank cover as defined in claim 7 wherein said oval plate is provided with a central aperture, a tank control device is mounted on said plate below said aperture, and the object underlying the showcase and visually observable therethrough is the face of said control device.

10. The tank cover as defined in claim 7 wherein said showcase assembly and oval plate are provided with mating dowels and apertures, whereby said showcase assembly may be properly positioned on said plate.

11. The tank cover as defined in claim 7 wherein said showcase assembly is mounted on a second oval plate adapted to rest on the first-mentioned oval plate.

12. A cover adapted to fit over the top of a vertically-disposed cylindrical tank having a dome-shaped top and a surrounding shoulder formed by the top of the cylindrical portion of the tank comprising: a cylindrical housing having a bottom edge adapted to fit upon the shoulder of said tank and to frictionally engage said dome-shaped top of the tank, said cylindrical housing having an elongated slot extending upwardly from said bottom edge for accommodating piping from the tank top and for permitting expansion of said bottom edge so that it can be forced in place on said tank top, said cylindrical housing having a top edge cut at an angle to the horizontal, and a retaining plate and showcase assembly recessed within the angled top end of said housing.

13. A cover adapted to fit over the top of a vertically-disposed cylindrical tank of a water conditioning system, comprising: a tubular housing of substantially the same diameter as said tank having its bottom edge cut off on a horizontal plane; means for securing said housing to the tank top with the bottom edge of the housing engaging the tank top; said housing having a top edge cut off at an angle to the horizontal; a plate of substantially the same configuration as the angled top edge of said housing and removably recessed within said housing at an angle substantially the same as said angled top edge of the housing; means for retaining said plate in said recessed position; timing means for controlling a function of said water conditioning system mounted within said housing on the underside of said removable plate, said plate having an aperture for access to said timing means through the top of said housing; and a showcase assembly for an advetrising display removably mounted on said plate and overlying said aperture.

14. A water conditioner including a vertically-disposed cylindrical water softening tank containing an ion exchange resin; a cover for the top of said water softening tank, said cover comprising a tubular housing having a bottom edge engaging the tank top and a top edge cut off at an angle to the horizontal, an oval plate having the shape defined by the opening at said angled top edge removably disposed in said housing, said oval plate being of such size as to just slide into said angled end of said tubular housing; and a timer mounted on said oval plate to control regenerating times and frequencies of said ion exchange resin.

15. A water conditioner as defined in claim 14 wherein said water softening tank is set within a container of greater diameter which contains material used in regenerating said ion exchange resin.

16. A water conditioner as defined in claim 15 wherein said water softening tank is taller than said regenerant container and said water conditioning tank is placed within said container in an off-center position, the space between the water conditioning tank and the interior walls of said container being covered by a circular lid having an aperture therein through which the upper portion of the water conditioner tank extends.

17. A tank assembly for a water conditioning system, comprising: a vertically-disposed cylindrical tank for ion exchange resin; a cylindrical container of larger diameter than said tank for holding regenerating material for the ion exchange resin of said tank; a lid for said cylindrical container; said lid having an aperture offset from the center and said tank being disposed in said container through the aperture in said lid and extending upwardly therefrom, said lid pivotally engaging said tank whereby it can be revolved around said tank to uncover a portion of said container and provide access thereto; and a cover for said cylindrical tank, said cover comprising a tubular housing forming an extension of said tank top and having an opening at its lower end for accommodating piping from the tank top, said housing having a top edge cut off at an angle to the horizontal, a removable plate recessed within the top of said housing and being disposed at substantially the same angle, and timer means for controlling the time sequence of flow of regenerating material from said container to said tank mounted on said plate.

18. The combination of claim 17 wherein said timing means is mounted on the underside of said plate and said plate is apertured for access thereto through the top of the housing.

19. The combination of claim 18 wherein said plate is provided with a removable showcase assembly overlying said aperture.

References Cited by the Examiner

UNITED STATES PATENTS

| 2,413,252 | 12/1946 | Smith | 220—82 |
| 2,987,187 | 6/1961 | Comroe | 210—244 |
| 3,111,030 | 12/1963 | Whitman | 73—201 |
| 3,151,759 | 10/1964 | Dykzeul et al. | 220—3.94 |

REUBEN FRIEDMAN, *Primary Examiner.*